(12) United States Patent
McDonald et al.

(10) Patent No.: US 11,345,469 B2
(45) Date of Patent: May 31, 2022

(54) AERIAL VEHICLE USING MOTOR PULSE-INDUCED CYCLIC CONTROL

(71) Applicant: Joby Aero, Inc., Santa Cruz, CA (US)

(72) Inventors: Robert Alan McDonald, San Luis Obispo, CA (US); Mark Moore, Henderson, NV (US); Ian Andreas Villa, San Francisco, CA (US)

(73) Assignee: Joby Aero, Inc., Santa Cruz, CA (US)

( * ) Notice: Subject to any disclaimer, the term of this patent is extended or adjusted under 35 U.S.C. 154(b) by 286 days.

(21) Appl. No.: 16/688,970

(22) Filed: Nov. 19, 2019

(65) Prior Publication Data

US 2020/0156778 A1 May 21, 2020

Related U.S. Application Data

(60) Provisional application No. 62/769,503, filed on Nov. 19, 2018.

(51) Int. Cl.
*B64C 29/00* (2006.01)
*B64C 27/26* (2006.01)
(Continued)

(52) U.S. Cl.
CPC .......... *B64C 29/0025* (2013.01); *B64C 27/26* (2013.01); *B64D 9/00* (2013.01); *B64D 27/24* (2013.01)

(58) Field of Classification Search
CPC . B64C 29/0016; B64C 29/0025; B64C 27/26; B64C 27/08; B64C 27/30
See application file for complete search history.

(56) References Cited

U.S. PATENT DOCUMENTS 3,963,372 A * 6/1976 McLain ................. B64C 27/14
416/30
5,595,474 A * 1/1997 Girard ...................... F01D 7/00
416/1
(Continued)

OTHER PUBLICATIONS

"Rotorcraft", Wikepedia [Online]. Retrieved from the Internet: URL: https: en.wikipedia.org wiki Rotorcraft, (Accessed on Nov. 17, 2018), 6 pgs.
(Continued)

*Primary Examiner* — Nicholas McFall
*Assistant Examiner* — Terri L Filosi
(74) *Attorney, Agent, or Firm* — Schwegman Lundberg & Woessner, P.A.

(57) ABSTRACT

An aerial vehicle that uses motor pulsed-induced cyclic control is provided. In example embodiments, the aerial vehicle comprises a fuselage incorporating a battery system and a payload bay for operatively receiving and holding a payload and at least one mono-blade rotor coupled to an electric motor and an electric motor control system. The electric motor control system controls the electric motor using pulse-induced cyclic control. The aerial vehicle further includes at least one wing, at least one cruise propeller, and an avionics system. The avionic system is configured to transition the aerial vehicle between a vertical take-off and landing mode in which the at least one mono-blade rotor is primarily engaged to propel the aerial vehicle vertically and a cruising mode in which the at least one cruise propeller is primarily engaged to propel the aerial vehicle horizontally.

13 Claims, 9 Drawing Sheets

(51) Int. Cl.
  *B64D 27/24* (2006.01)
  *B64D 9/00* (2006.01)

(56) References Cited

U.S. PATENT DOCUMENTS

| | | |
|---|---|---|
| 6,619,585 B1 | 9/2003 | Lidak |
| 9,120,560 B1* | 9/2015 | Armer ................. B64C 29/0025 |
| 9,714,089 B1* | 7/2017 | Louw ................... B64C 39/024 |
| 9,889,925 B2 | 2/2018 | Rawdon |
| 2016/0046369 A1 | 2/2016 | Watkins |
| 2018/0222579 A1* | 8/2018 | Simon .................. B64C 27/473 |
| 2020/0207462 A1* | 7/2020 | Kim ........................ B64C 27/10 |

OTHER PUBLICATIONS

"Single-blade propeller", Wikipedia [Online]. Retrieved from the Internet: URL: https: en.wikipedia.org wiki Single-blade_propeller, (accessed on Nov. 17, 2018), 3 pgs.

"Stop-Rotor Rotary Wing Aircraft", [Online]. Retrieved from the Internet:https: www.nrl.navy.mil techtransfer available-technologies electronics stop-rotor-rotary-wing-aircraft, (accessed on Nov. 17, 2018), 2 pgs.

Lee, Richard, "Modeling and Control of Coaxial UAV with Swashplate Controlled Lower Propeller", CMU-RI-TR-16-33, (Jun. 2016), 20 pgs.

Paulos, James, "Cyclic Blade Pitch Control Without a Swashplate for Small Helicopters", Journal of Guidance, Control and Dynamics, (2017), 35 pgs.

Paulos, James, "Emulating a Fully Actuated Aerial Vehicle using Two Actuators", ICRA 2018, (2018), 6 pgs.

Paulos, James, "Flight Performance of a Swashplateless Micro Air Vehicle", ICRA 2015, (2015), 6 pgs.

Paulos, James, "Scalability of Cyclic Control without Blade Pitch Actuators", SciTech 2018, (2018), 18 pgs.

Uber, "Fast-Forwarding to a Future of On-Demand Urban Air Transportation Introduction", Uber Elevate, (Oct. 27, 2016), 98 pgs.

Williams, Robert M, "Application of Circulation Control Rotor Technology to a Stopped Rotor Aircraft Design", David W Taylor Naval Ship Research and Development Center ADA029168, (Dec. 1975), 34 pgs.

\* cited by examiner

AERIAL VEHICLE USING MOTOR PULSE-INDUCED CYCLIC CONTROL

CROSS REFERENCE TO RELATED APPLICATION

This application claims priority to U.S. Provisional Patent Application No. 62/769,503 filed Nov. 19, 2018 and entitled "Aerial Vehicle Using Motor Pulse-Induced Cyclic," the contents of which are incorporated herein by reference in its entirety.

TECHNICAL FIELD

The subject matter disclosed herein generally relates to aerial vehicles. Specifically, the present disclosure addresses aerial vehicles having mono-blade rotors that use motor pulse-induced cyclic control.

BACKGROUND

Conventionally, cyclic control in large aircraft is typically obtained through the use of a mechanical swashplate system. The mechanical swashplate system typically includes a swashplate bearing surface, several ball joint linkages, and several ball servomotor actuators. However, the weight, size, assembly complexity, and requisite maintenance of such a mechanical swashplate system becomes significantly burdensome in aerial vehicles that are relatively small such as, for example, a drone.

BRIEF DESCRIPTION OF THE DRAWINGS

Some embodiments are illustrated by way of example and not limitation in the figures of the accompanying drawings. To easily identify the discussion of any particular element or act, the most significant digit or digits in a reference number refer to the figure number in which that element is first introduced.

DETAILED DESCRIPTION

Figure 1:
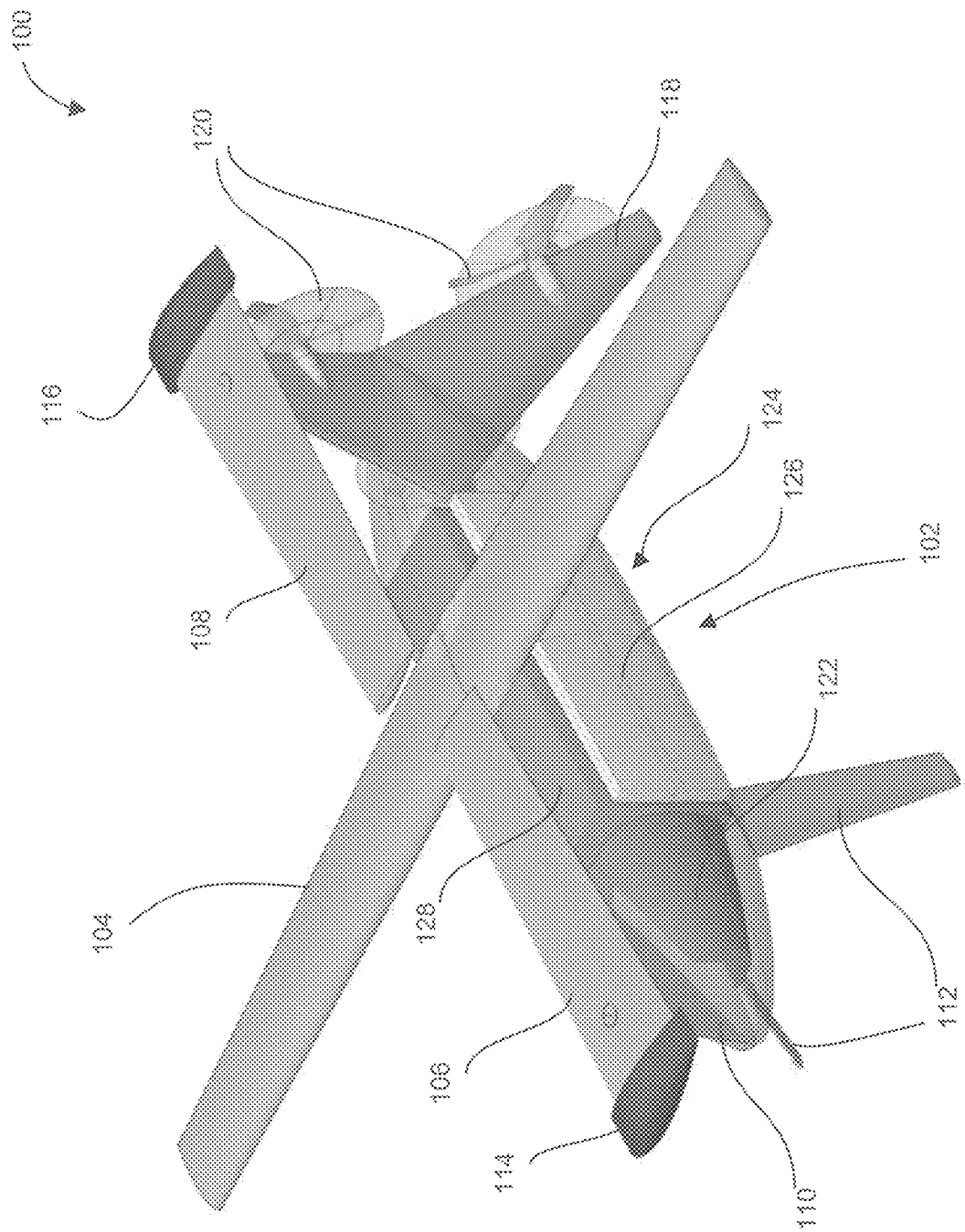
FIG. 1 illustrates a front isometric view showing a tandem-rotor aerial vehicle in accordance with one embodiment.

The description that follows describes systems, methods, techniques, and instruction sequences that illustrate example embodiments of the present subject matter. In the following description, for purposes of explanation, numerous specific details are set forth in order to provide an understanding of various embodiments of the present subject matter. It will be evident, however, to those skilled in the art, that embodiments of the present subject matter may be practiced without some or other of these specific details. Examples merely typify possible variations. Unless explicitly stated otherwise, structures (e.g., structural components) are optional and may be combined or subdivided, and operations (e.g., in a procedure, algorithm, or other function) may vary in sequence or be combined or subdivided.

This disclosure relates, in some example embodiments, to an aerial vehicle (e.g., a drone or Vertical Take-Off and Landing (VTOL) vehicle) that seeks to provide the following:

Leveraging unique advantages of electric motors through motor pulse-induced cyclic control.

Achieving high vehicle reliability through reducing of servos/actuators/articulation (based on an assumption that reliability of these solutions is lower than electric motors).

Achieving aerial vehicle control through a reduced number of motors/controllers (with potential motor redundancy through dual windings/controllers).

Achieving sufficient cruise efficiency to perform commercial range and payload requirements with reasonable battery and structural mass fraction.

Maintaining an ability to perform vertical descent without uneven wing flow separation.

Maintaining an ability to perform challenging sloped takeoffs/landings from a car rooftop.

To this end, the disclosed aerial vehicles, in various example embodiments:

Use motor pulse-induced cyclic control with a mono-blade rotor (on single or tandem-rotor configuration) to achieve greater on-blade cyclic control than through two-blade rotor application for hover/transition flight pitch/roll/yaw control.

Use a stopped mono-blade rotor to achieve low cruise drag.

Use an electromagnet or magswitch to "lock" a trailing mono-rotor while the mono-rotor is stopped (e.g., in a cruise mode). In one embodiment, the "lock" uses a very small 'on' power-draw that will drop when power is cut.

Use a stationary trailing mono-rotor azimuth angle change for cruise roll control.

Use an inverted Y-tail with three cruise motors and small propellers (e.g., one on each blade of the Y-tail) to provide cruise pitch and proverse yaw control, while maintaining rotor clearance. This configuration also provides counter-torque for a main rotor.

Use four propellers on tandem wings (e.g., high and low wings) to provide cruise pitch and yaw. This configuration also provides counter-torque for the main-rotor.

Use a free-wing to align the wing with flow direction in vertical descent.

Use a voice-annunciator to communicate with operating area as safety measure. For example, "Clear area, rotor will start rotating in 5 . . . 4 . . . 3 . . . 2 . . . 1 . . . " may be announced.

Integration of LIDAR/radar sensing as mono-blade rotor counterweight.

FIG. 1 is a front isometric view showing a tandem-rotor aerial vehicle 100, according to some example embodiments. The tandem-rotor aerial vehicle 100 has a fuselage 102 and a top-mounted wing 104 positioned above the fuselage 102.

A pair of mono-blade rotors, namely a front mono-blade rotor 106 and a rear mono-blade rotor 108 are rotatably coupled to a fore and aft of the fuselage 102 and provide lift during vertical ascent and decent (e.g., when the tandem-rotor aerial vehicle 100 transitions into a loading mode, discussed below with reference to FIG. 4). Specifically, the front mono-blade rotor 106 is rotatably mounted on a front blade 110 (shown in FIG. 2) that extends vertically from a front of the fuselage 102, while the rear mono-blade rotor 108 is rotatably mounted to one of the rear blades 118 that extends vertically from an aft of the fuselage 102. Each of the front mono-blade rotor 106 and the rear mono-blade rotor 108 is driven by an associated electric motor that is controlled using motor pulse-induced cyclic control in order to improve on-blade cyclic control.

A mono-rotor counterweight 114 is secured to and counter-balances the front mono-blade rotor 106, and a mono-rotor counterweight 116 is likewise secured to and counter-balances the rear mono-blade rotor 108. LIDAR and radar modules and components are included in each of the mono-rotor counterweight 114 and the mono-rotor counterweight 116 and are communicatively coupled to a guidance system housed in an avionics bay 122.

A pair of front stabilizer blades 112 extends from the front of the fuselage 102, while three rear blades 118 are secured at an aft of the fuselage 102. Cruise propellers 120 are rotatably mounted on each of the respective rear blades 118.

Turning to the interior of the fuselage 102, the avionics bay 122 is at a fore interior of the fuselage 102, while a portion of the remainder of the fuselage 102 comprises a sideloading payload bay 124 in which may be contained a pair of battery packs 126 and a payload 128. In one embodiment, the battery packs 126 are coupled to each of the electric motors of the tandem-rotor aerial vehicle 100 to operationally provide electric power to the electric motors.

FIG. 1 shows the front mono-blade rotor 106 and the rear mono-blade rotor 108 as stopped and locked inward during unloading of the payload 128 from the sideloading payload bay 124. When in the locked position, in accordance with one embodiment, an electromagnet or magswitch may be used to lock the mono-blade rotor 106 and/or 108 while the mono-blade rotor 106 and/or 108 is stopped. In one embodiment, the lock uses a very small 'on' power-draw that will drop when power is cut.

Figure 2:
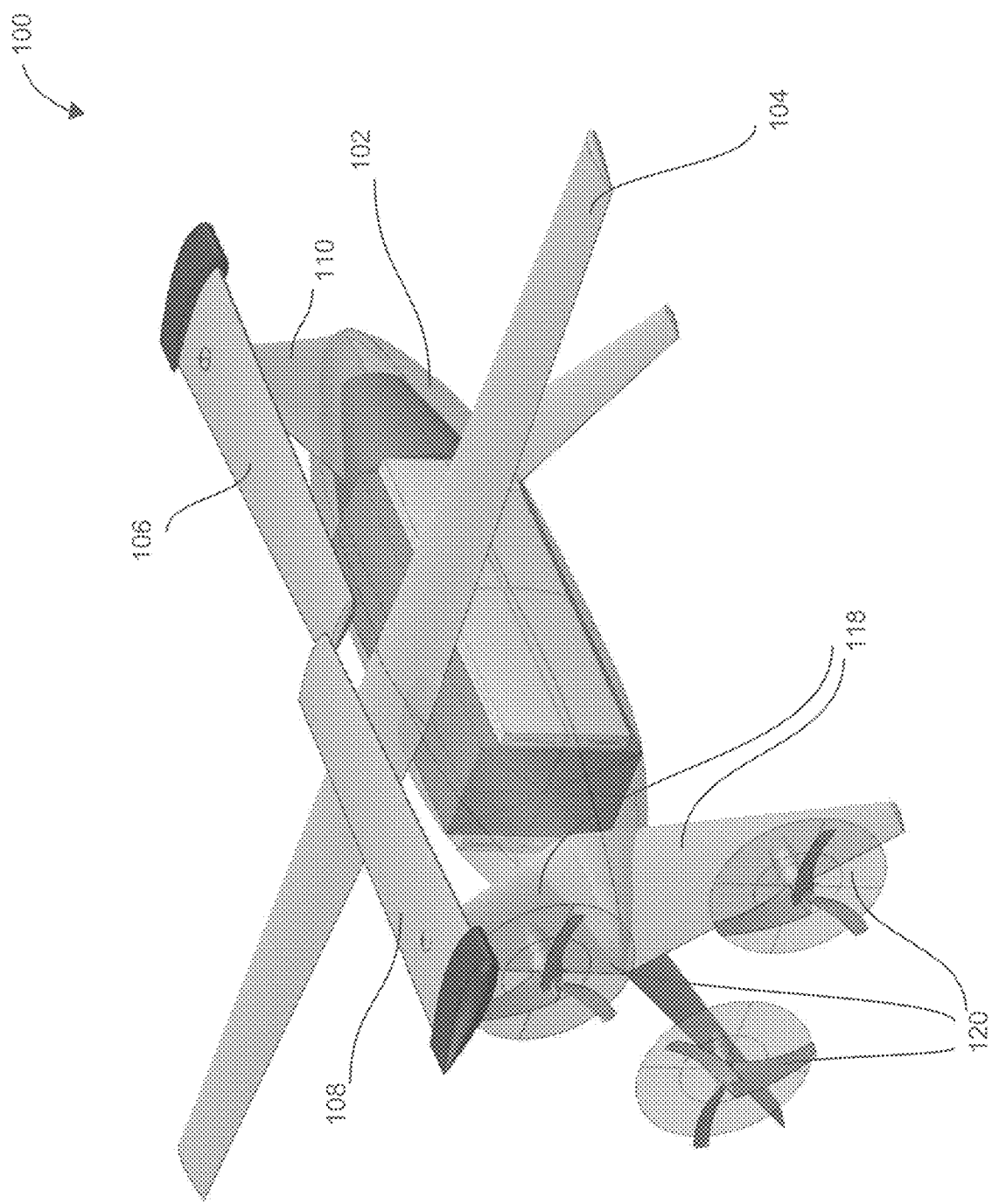
FIG. 2 illustrates a rear isometric view of the tandem-rotor aerial vehicle in accordance with one embodiment.

FIG. 2 is a rear isometric view of the tandem-rotor aerial vehicle 100, according to some example embodiments. FIG. 2 provides a clearer view of the cruise propellers 120 coupled to the respective rear blades 118. Each of the cruise propellers 120 is driven by a dedicated electric motor, and provides thrust and pitch, as well as proverse yaw control, for the tandem-rotor aerial vehicle 100 during flight.

In example embodiments, the rear blades 118 are swept in shape, which provides for an improved acoustic signature. The rear blades 118 may also be arranged to provide an inverted Y-tail for the fuselage 102. Three cruise motors and the associated cruise propellers 120 provide cruise pitch and proverse yaw control, while maintaining rotor clearance. The three cruise propellers 120 also operationally provide counter-torque for a main rotor (e.g., the front mono-blade rotor 106 and/or the rear mono-blade rotor 108).

It will also be noted that the respective heights of the front mono-blade rotor 106 and the rear mono-blade rotor 108 are offset relative to each other, with the rear mono-blade rotor 108 being mounted higher with respect to the fuselage 102 than the front mono-blade rotor 106 in accordance with one embodiment. In an alternative embodiment, the front mono-blade rotor 106 may be mounted higher with respect to the fuselage 102 than the rear mono-blade rotor 108.

Figure 3:
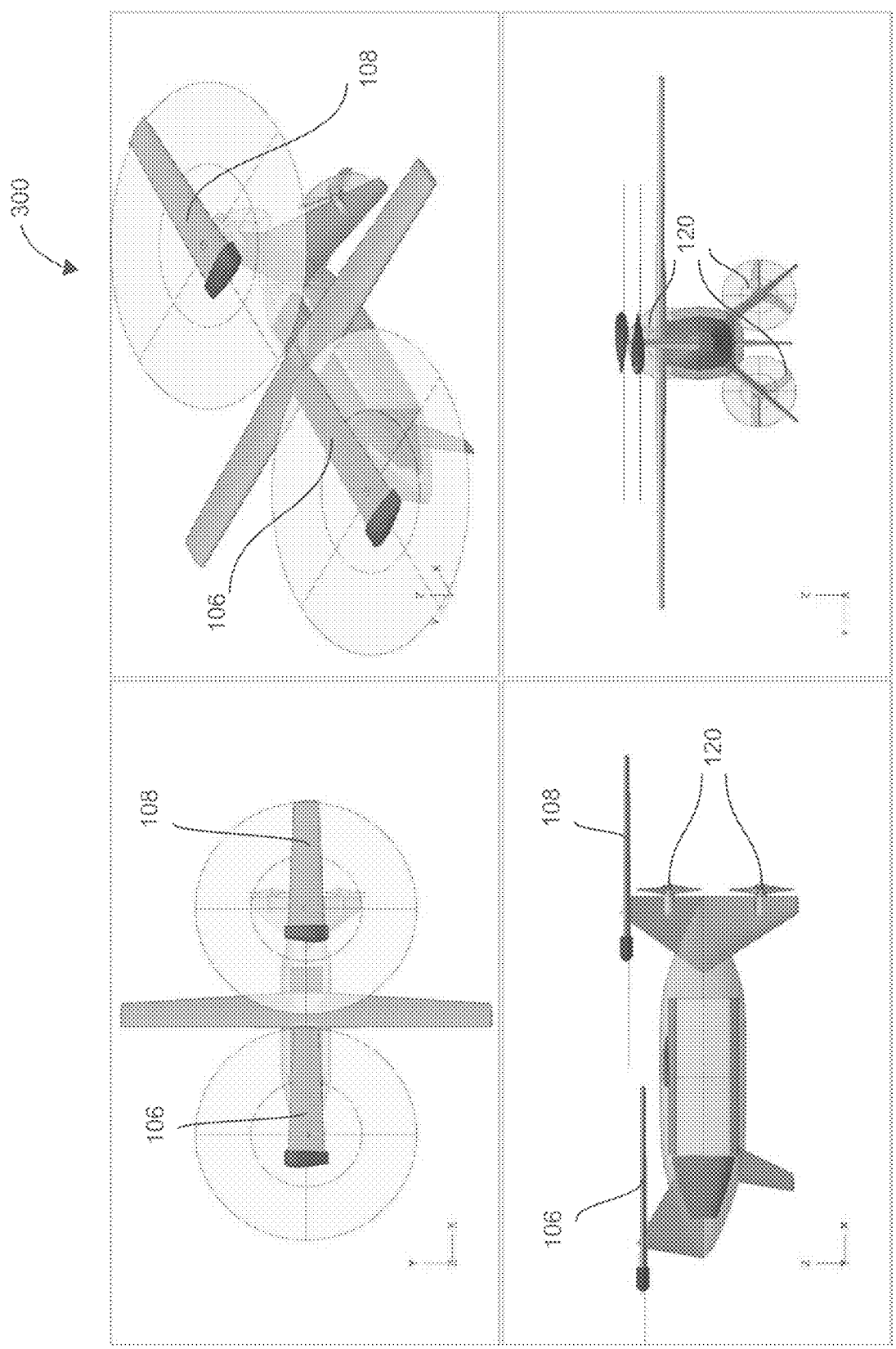
FIG. 3 illustrates views of the tandem-rotor aerial vehicle in a cruise mode in accordance with one embodiment.

FIG. 3 shows respective top, isometric, side, and front views of the tandem-rotor aerial vehicle 100 in a cruise mode 300 according to some example embodiments. When in the cruise mode 300, the tandem-rotor aerial vehicle 100 is driven by the cruise propellers 120, and the front mono-blade rotor 106 and rear mono-blade rotor 108 are oriented and locked so that their respective distal ends point towards the trailing end of the fuselage 102. Each of the front mono-blade rotor 106 and rear mono-blade rotor 108 may be a stopped rotor, which is stopped and locked when the tandem-rotor aerial vehicle 100 is in the cruise mode 300, but which is engaged during Vertical Take-Off and Landing (VTOL) and during transition between the cruise mode 300 and VTOL. An electromagnet or magswitch may be used to "lock" the rear mono-blade rotor 108 while stopped, with a small 'on' power-draw that drops when power is cut to the associated electric motor. In some embodiments, the front mono-blade rotor 106 may also be locked while stopped in a similar manner.

Figure 4:
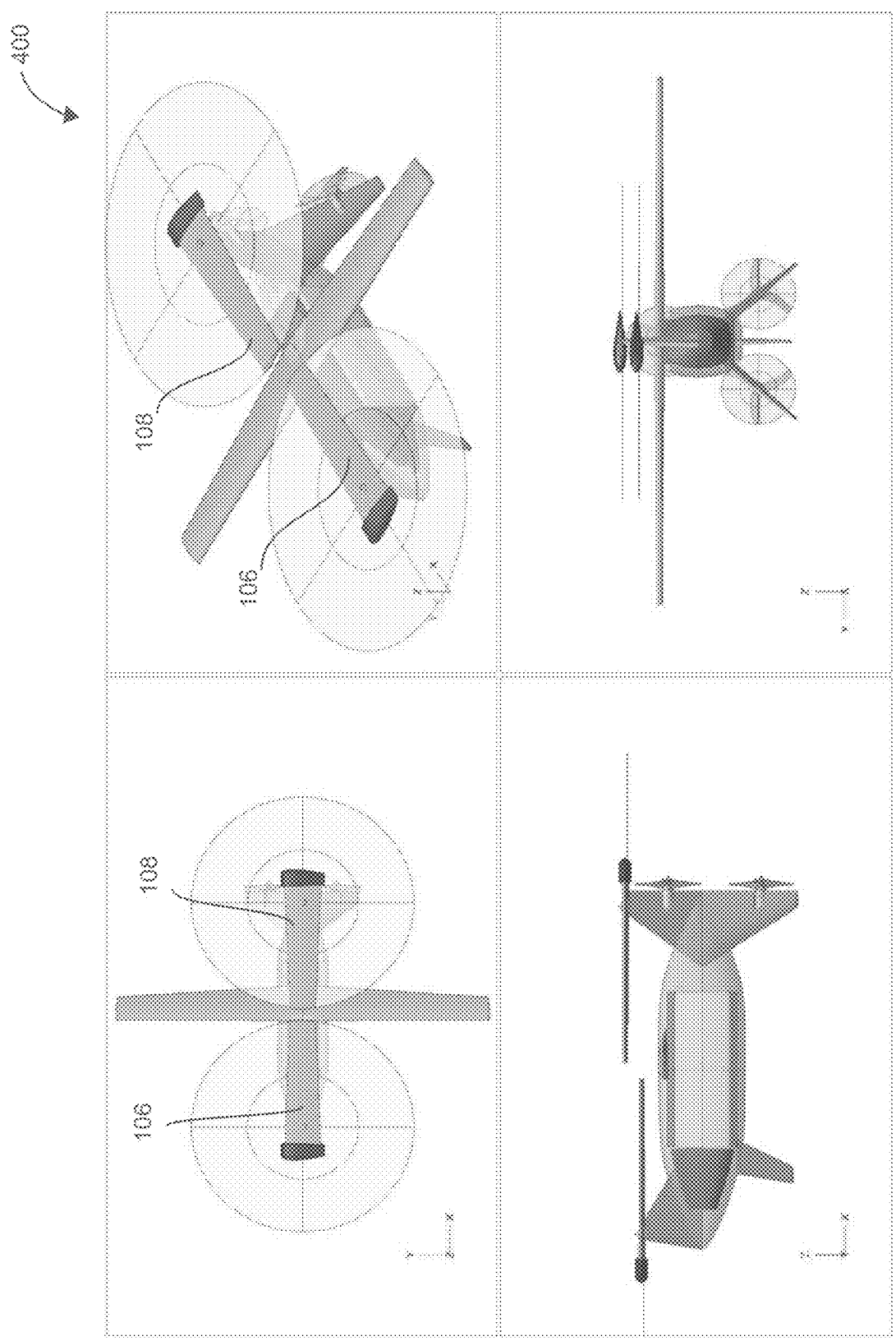
FIG. 4 illustrates views of the tandem-rotor aerial vehicle in a loading mode in accordance with one embodiment.
Figure 5:
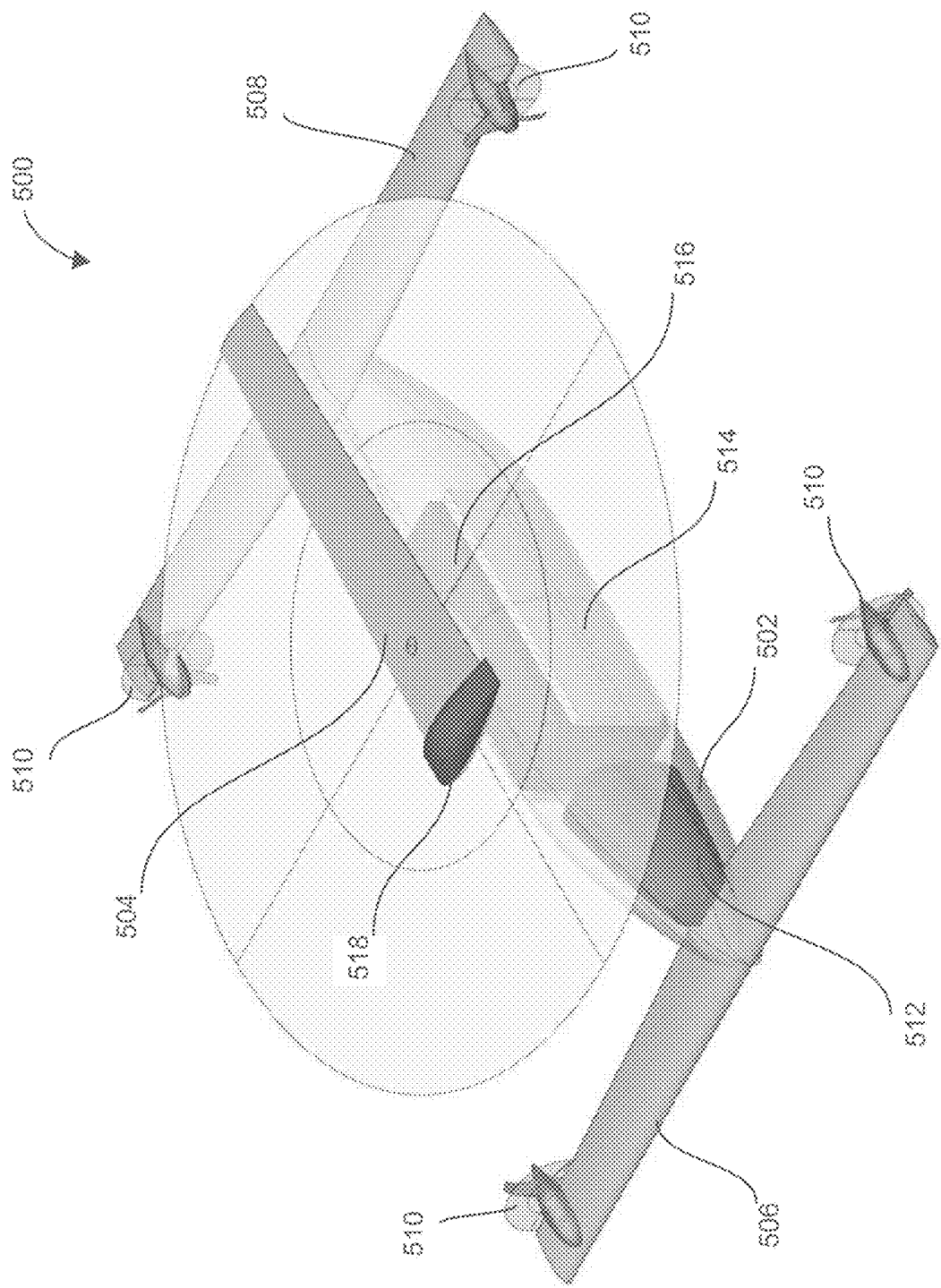
FIG. 5 illustrates a front isometric view of a mono-roto aerial vehicle in accordance with one embodiment.
Figure 7:
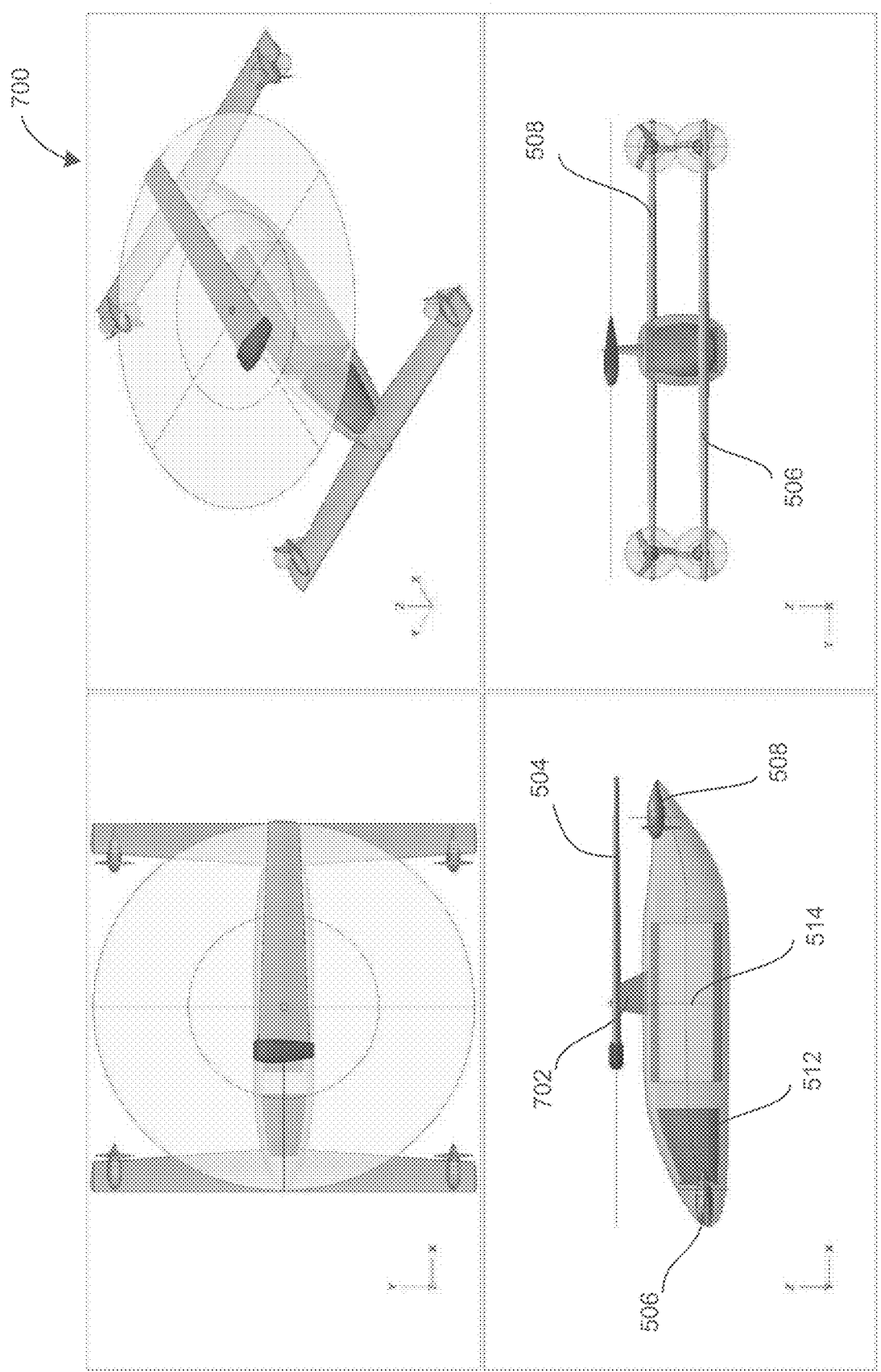
FIG. 7 illustrates views of the mono-roto aerial vehicle in accordance with one embodiment.

FIG. 4 shows respective top, isometric, side, and front views of the tandem-rotor aerial vehicle 100 in a loading mode 400 according to some example embodiments. When in the loading mode 400, the front mono-blade rotor 106 and rear mono-blade rotor 108 are oriented and locked so that their respective distal ends point towards each other. Here too, an electromagnet or magswitch may be used to "lock" the mono-blade rotor 106 and/or 108 while stopped FIG. 5 is a front isometric view of a mono-roto aerial vehicle 500, according to some example embodiments. In example embodiments, the mono-rotor aerial vehicle 500 comprises high and low tandem wings, namely leading wing 506 and trailing wing 508. The mono-roto aerial vehicle 500 has a fuselage 502, with a mono-blade rotor 504 rotatably mounted on a center pillar (e.g., center pillar 702 as shown in FIG. 7) to secure the mono-blade rotor 504 to the fuselage 502. A mono-rotor counterweight 518 is secured at, or adjacent to, a short-end of the mono-blade rotor 504. A LIDAR/radar module and component(s) may be included in the mono-rotor counterweight 518 and are communicatively coupled to a guidance system housed in an avionics bay 512.

The mono-blade rotor 504 is used during Vertical Take-Off and Landing (VTOL) of the mono-roto aerial vehicle 500 and also during the transition from VTOL to a cruise mode. During cruising (cruise mode), the mono-blade rotor 504 is stopped and locked in the position shown in FIG. 5 and FIG. 6, with a distant end of the mono-blade rotor 504 pointing towards a rear of the mono-roto aerial vehicle 500. As with the rear mono-blade rotor 108, the mono-blade rotor 504 may be a stopped rotor, and an electromagnet or magswitch may be used to "lock" the mono-blade rotor 504 while stopped, with a small 'on' power-draw that drops when power is cut to the associated electric motor.

The leading wing 506 is attached adjacent to a nose of the fuselage 502, and a trailing wing 508 is attached adjacent to a tail of the fuselage 502. The respective heights of the leading wing 506 and the trailing wing 508 may be offset relative to the fuselage 502, as is most clearly seen in FIG. 7.

Wing-tip propellers 510 are located at, or adjacent to, the tips of each of the leading wing 506 and trailing wing 508 to provide propulsion to the mono-roto aerial vehicle 500 during the cruise mode. In example embodiments, the wing-tip propellers 510 reduce drag and provide effective pitch control. The use of four wing-tip propellers 510 on the tandem wings (high and low) provide cruise pitch and yaw, as well as counter-torque for the mono-blade rotor 504.

Figure 6:
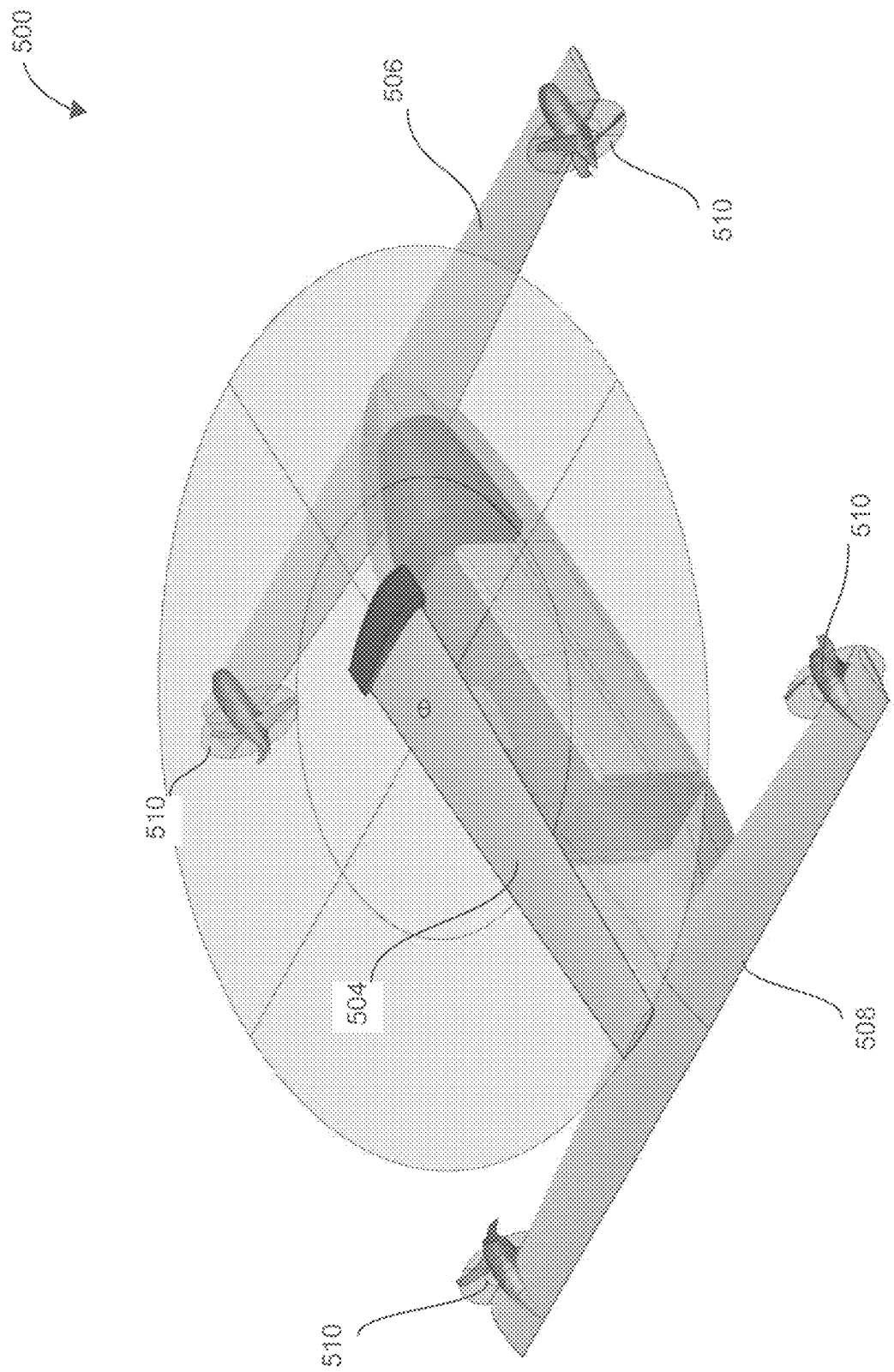
FIG. 6 illustrates is a rear isometric view of the mono-roto aerial vehicle in accordance with one embodiment.

FIG. 6 is a rear isometric view of the mono-roto aerial vehicle 500, according to some example embodiments. Furthermore, FIG. 7 shows respective top, isometric, side, and front views of the mono-roto aerial vehicle 500, according to some example embodiments. Turning to the interior of the fuselage 502, the avionics bay 512 is at a fore interior of the fuselage 502, while a remaining portion of the fuselage 102 comprises a sideloading payload bay 514 in which may be housed one or more battery packs and a payload 516. The one or more battery packs may be coupled to an electric motor of the mono-rotor aerial vehicle 500 to operationally provide electric power to the electric motor.

Figure 8:
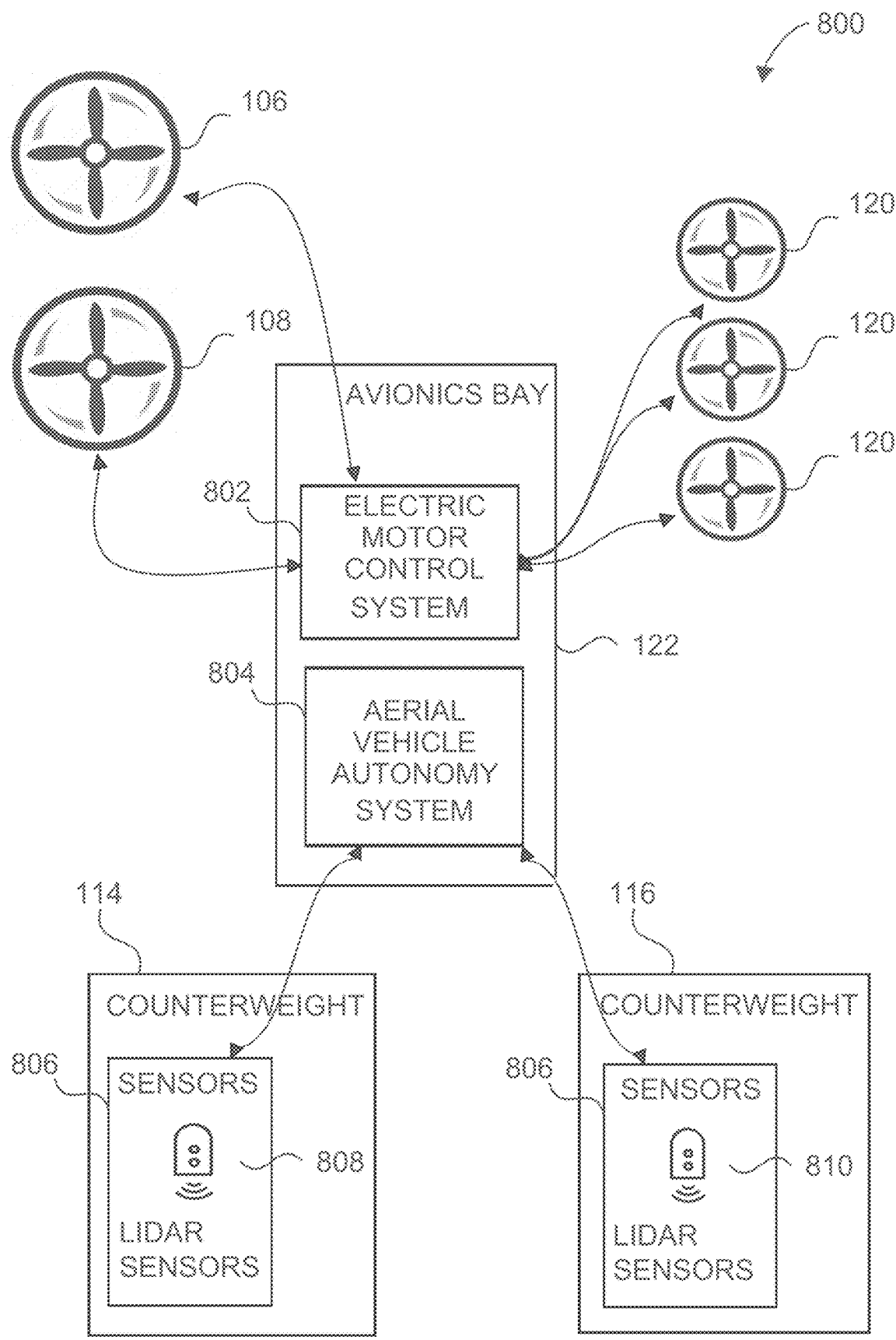
FIG. 8 illustrates an avionics system in accordance with one embodiment.

FIG. 8 is a block diagram illustrating an avionics system 800, including an aerial vehicle autonomy system 804 and an electric motor control system 802, located within the avionics bay 122 of an aerial vehicle (e.g., the tandem-rotor aerial vehicle 100 or the mono-roto aerial vehicle 500) discussed herein. The electric motor control system 802 is coupled to a pair of rotors, namely the front mono-blade rotor 106 and the rear mono-blade rotor 108, and controls these rotors using, inter alia, pulse-induced cyclic control.

Cyclic control varies blade pitch through each revolution of the rotor. This results in a cyclic variation in lift of the blade, a controlled blade flapping response, and ultimately useful control authority in pitch and roll, for example. Cyclic control in large aircraft is typically obtained through the use of a mechanical swashplate that typically includes a swashplate bearing surface, several ball joint linkages, and several ball servomotor actuators. However, the weight, size, assembly complexity, and requisite maintenance of these systems becomes significantly burdensome in aerial vehicles that are relatively small (e.g., a drone). As such, pulsed-induced cyclic control is used to retain the benefits of cyclic control while avoiding use of a bulky mechanical swashplate system.

In one embodiment, pulsed-induced cyclic control may comprise a method for cyclic blade pitch control that involves modulating torque applied to a flexible rotor. The modulation can induce cyclic blade pitch changes that emulate actions of a conventional swashplate system without requiring such a system or blade pitch actuators to be present. In the tandem-rotor aerial vehicle embodiment discussed above, one rotor blade (e.g., the front mono-blade rotor 106) is provided with a positive lag-pitch coupling and another rotor blade (e.g., the rear mono-blade rotor 108) is provided with a negative lag-pitch coupling. By modulating drive motor torque through every rotation, a lead-lag response can be produced which in turn drives a cyclic blade pitch variation. As the applied motor torque is modulated, the two blades respond by leading and lagging cyclically in phase with rotor rotation. As a result, one blade may be obtaining its maximum pitch across a nose of the aircraft while the other blade attains its minimum applied pitch across the tail, for example. The results (e.g., blade pitch changes, rotor flapping response, aircraft flight response) can emulate actions of the conventional swashplate system without requiring a swashplate.

In an alternative embodiment, non-mono-blades may be used. As noted above, opposite blades should be tailored such that the coupling is opposite in the opposite blades (e.g., for non-mono-blade or 2-bladed rotors). As such, flexibility may be introduced and controlled by including, for example, a hinge or a flexure. From a practical sense, one degree of freedom (e.g., from six possible: three translational and three rotational) may be introduced. In one embodiment, the one degree of freedom is one rotational degree of freedom and the embodiment uses orientation of the rotation axis to couple blade lag-pitch. In example embodiments, an ideal hinge introduces one degree of freedom, but has no stiffness or damping, while an ideal and simple flexure introduces one degree of freedom and has stiffness (e.g., flexing material) but no damping and a real flexure has near zero damping. Further still, multi-layer flexures can be designed to have damping.

To tailor the dynamics of the system, the system may be treated as a spring-mass-damper system whereby these terms are controlled to tune the response. For example, mass can be controlled by adding weight to a blade, while stiffness can be controlled by moving from a hinge to a flexure and carefully designing that flexure. Additionally, adding damping to a hinge or flexure is possible in further examples.

Further details regarding pulse-induced cyclic control are provided in the following publications, which are incorporated herein by reference: (1) James J. Paulos and Mark Yim. "Scalability of Cyclic Control without Blade Pitch Actuators", 2018 AIAA Atmospheric Flight Mechanics Conference, AIAA SciTech Forum, (AIAA 2018-0532), https://doi.org/10.2514/6.2018-0532 and (2) James Paulos and Mark Yim. "Cyclic Blade Pitch Control for Small UAV Without a Swashplate", AIAA Atmospheric Flight Mechanics Conference, AIAA SciTech Forum, (AIAA 2017-1186), https://doi.org/10.2514/6.2017-1186.

The electric motor control system 802 is further coupled to the cruise propellers 120, and operationally controls these cruise propellers 120. Specifically, the electric motor control system 802, as part of the avionics system 800, transitions an aerial vehicle (e.g., tandem-rotor aerial vehicle 100) between a first Vertical Take-Off and Landing (VTOL) mode in which the at least one mono-blade rotor is primarily engaged to propel the aerial vehicle and a cruise mode (e.g., cruise mode 300) in which the cruise propellers 120 are primarily engaged to propel the aerial vehicle.

As shown, the aerial vehicle autonomy system 804 is communicatively coupled to sensors 806 located in counterweights (e.g., the counterweights 114, 116) of the relevant aerial vehicle. The sensors 806 may include LIDAR sensors 808 and 810, radar sensors, and/or cameras, merely for example. The spinning motion of the rotor blades, to which the counterweights are attached, may be used by the LIDAR sensors 808 or LIDAR sensors 810 to generate a 3600 view from the relevant aerial vehicle in example embodiments.

Figure 9:
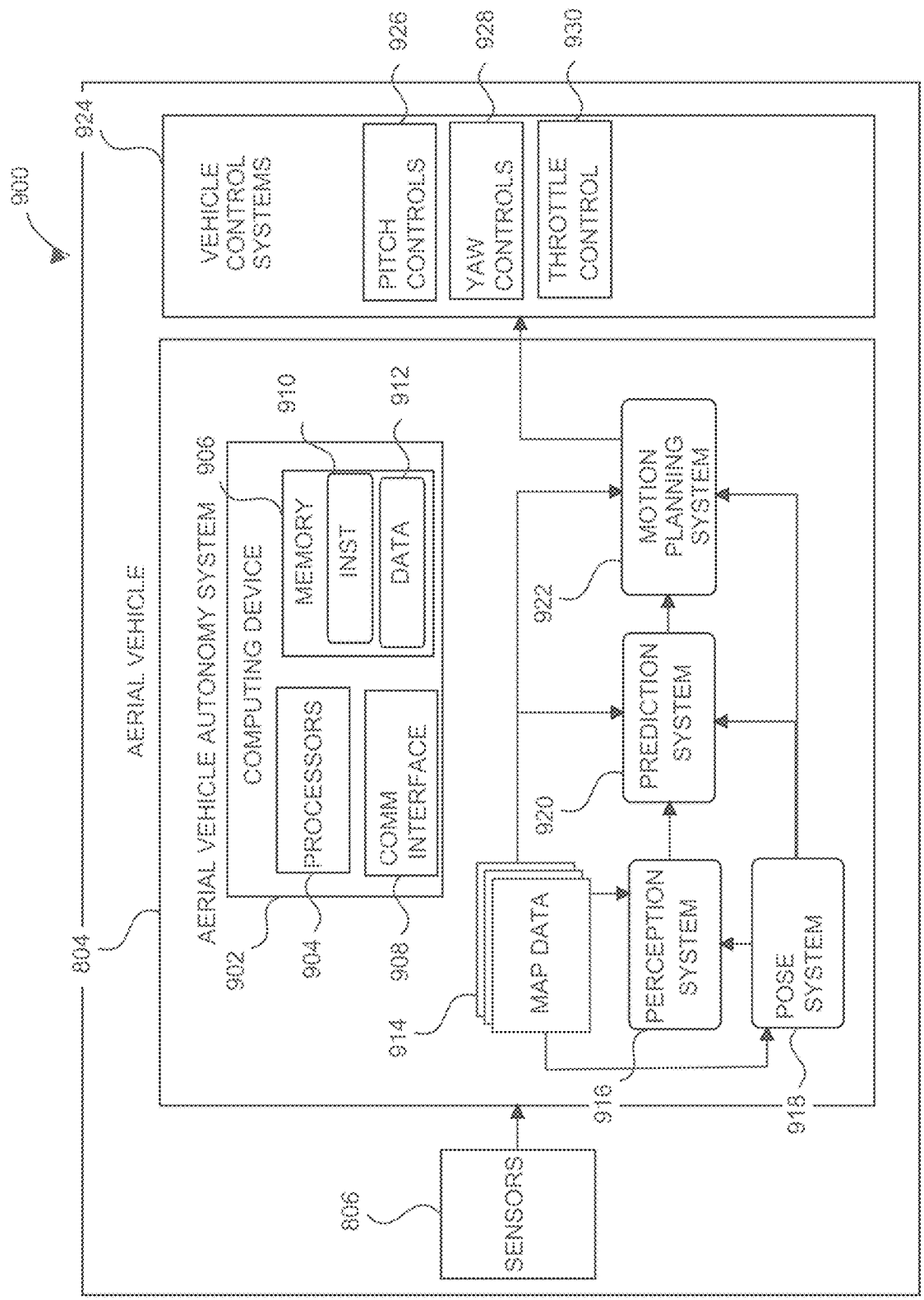
FIG. 9 is a diagrammatic representation of an autonomous vehicle system, in accordance with some example embodiments.

FIG. 9 depicts a block diagram of the aerial vehicle 900 (e.g., tandem-rotor aerial vehicle 100 or the mono-roto aerial vehicle 500), according to example embodiments. The aerial vehicle 900 can be, for example, an autonomous or semi-autonomous aerial vehicle. The aerial vehicle 900 includes the one or more sensors 806, the aerial vehicle autonomy system 804, and one or more vehicle control systems 924.

The aerial vehicle autonomy system 804 can be engaged to control the aerial vehicle 900 or to assist in controlling the aerial vehicle 900. In particular, the aerial vehicle autonomy system 804 receives sensor data from the sensors 806, attempts to comprehend the environment surrounding the aerial vehicle 900 by performing various processing techniques on data collected by the sensors 806 and generates an appropriate motion path through an environment. The aerial vehicle autonomy system 804 can control the one or more vehicle control systems 924 to operate the aerial vehicle 900 according to the motion path.

The aerial vehicle autonomy system 804 includes a perception system 916, a prediction system 920, a motion planning system 922, and a pose system 918 that cooperate to perceive the surrounding environment of the aerial vehicle 900 and determine a motion plan for controlling the motion of the aerial vehicle 900, accordingly.

Various portions of the aerial vehicle autonomy system 804 receive sensor data from the sensors 806. For example, the sensors 806 may include remote-detection sensors as well as motion sensors such as an inertial measurement unit (IMU), one or more encoders, and so forth. The sensor data can include information that describes the location of objects within the surrounding environment of the aerial vehicle 900, information that describes the motion of the vehicle, and so forth.

The sensors 806 may also include one or more remote-detection sensors or sensor systems, such as, for example, a LIDAR (e.g., LIDAR sensors 808, LIDAR sensors 810), a RADAR, and/or one or more cameras. As one example, a LIDAR system of the sensors 806 generates sensor data (e.g., remote-detection sensor data) that includes location (e.g., in three-dimensional space relative to the LIDAR system) of a number of points that correspond to objects that have reflected a ranging laser. For example, the LIDAR system can measure distances by measuring the Time of Flight (TOF) that it takes a short laser pulse to travel from the sensor to an object and back, calculating the distance from the known speed of light.

As another example, for a RADAR system, the sensors 806 generates sensor data (e.g., remote-detection sensor data) that includes the location (e.g., in three-dimensional space relative to the RADAR system) of a number of points that correspond to objects that have reflected ranging radio waves. For example, radio waves (e.g., pulsed or continuous) transmitted by the RADAR system can reflect off an object and return to a receiver of the RADAR system, giving information about the object's location and speed. Thus, a RADAR system can provide useful information about the current speed of an object.

As yet another example, one or more cameras of the sensors 806 may generate sensor data (e.g., remote sensor data) including still or moving images. Various processing techniques (e.g., range imaging techniques such as, for example, structure from motion, structured light, stereo triangulation, and/or other techniques) can be performed to identify the location (e.g., in three-dimensional space relative to the one or more cameras) of a number of points that correspond to objects that are depicted in image or images captured by the one or more cameras. Other sensor systems can identify the location of points that correspond to objects as well.

As another example, the sensors 806 can include a positioning system. The positioning system can determine a current position of the aerial vehicle 900. The positioning system can be any device or circuitry for analyzing the position of the aerial vehicle 900. For example, the positioning system can determine a position by using one or more of inertial sensors, a satellite positioning system such as a Global Positioning System (GPS), based on IP address, by using triangulation and/or proximity to network access points or other network components (e.g., cellular towers, WiFi access points), and/or other suitable techniques. The position of the aerial vehicle 9000 can be used by various systems of the aerial vehicle autonomy system 804.

Thus, the sensors 806 can be used to collect sensor data that includes information that describes the location (e.g., in three-dimensional space relative to the aerial vehicle 900) of points that correspond to objects within the surrounding environment of the aerial vehicle 900. In some implementations, the sensors 806 can be located at various different locations on the aerial vehicle 900. As an example, one or more cameras, RADAR, and/or LIDAR sensors (e.g., LIDAR sensors 808 or LIDAR sensors 810) are located in the mono-rotor counterweight 114, the mono-rotor counterweight 114, or the mono-rotor counterweight 518.

The pose system 918 receives some or all of the sensor data from the sensors 806 and generates vehicle poses for the aerial vehicle 900. A vehicle pose describes the position (including altitude) and attitude of the vehicle. The position of the aerial vehicle 900 is a point in a three-dimensional space. In some examples, the position is described by values for a set of Cartesian coordinates, although any other suitable coordinate system may be used. The attitude of the aerial vehicle 900 generally describes the way in which the aerial vehicle 900 is oriented at its position. In some examples, attitude is described by a yaw about the vertical axis, a pitch about a first horizontal axis, and a roll about a second horizontal axis. In some examples, the pose system 918 generates vehicle poses periodically (e.g., every second, every half second). The pose system 918 appends time stamps to vehicle poses, where the time stamp for a pose indicates a point in time that is described by the pose. The pose system 918 generates vehicle poses by comparing sensor data (e.g., remote sensor data) to map data 914 describing the surrounding environment of the aerial vehicle 900.

In some examples, the pose system 918 includes localizers and a pose filter. Localizers generate pose estimates by comparing remote sensor data (e.g., LIDAR, RADAR) to map data. The pose filter receives pose estimates from the one or more localizers as well as other sensor data such as, for example, motion sensor data from an IMU, encoder, odometer, etc. In some examples, the pose filter executes a Kalman filter or other machine learning algorithm to combine pose estimates from the one or more localizers with motion sensor data to generate vehicle poses. In some examples, localizers generate pose estimates at a frequency less than the frequency at which the pose system 918 generates vehicle poses. Accordingly, the pose filter generates some vehicle poses by extrapolating from previous pose estimates.

The perception system 916 detects objects in the surrounding environment of the aerial vehicle 900 based on the sensor data, the map data 914, and/or vehicle poses provided by the pose system 918. The map data 914, for example, may provide detailed information about the surrounding environment of the aerial vehicle 900. In example embodiments, the map data 914 can provide information regarding: identity and location of geographic entities, such as different roadways, segments of roadways, buildings, or other items or objects (e.g., lampposts, crosswalks, curbing); location and directions of traffic lanes; and/or any other map data that provides information that assists the aerial vehicle autonomy system 804 in comprehending and perceiving its surrounding environment and its relationship thereto. The perception prediction system 920 uses vehicle poses provided by the pose system 918 to place the aerial vehicle 900 in the environment.

In some examples, the perception system 916 determines state data for objects in the surrounding environment of the aerial vehicle 900. State data may describe a current state of an object (also referred to as features of the object). The state data for each object describes, for example, an estimate of the object's current location (also referred to as position); current speed (also referred to as velocity); current acceleration; current heading; current orientation; size/shape/footprint (e.g., as represented by a bounding shape such as a bounding polygon or polyhedron); type/class (e.g., vehicle versus pedestrian versus bicycle versus other); yaw rate; distance from the aerial vehicle 900; minimum path to interaction with the aerial vehicle 900, minimum time duration to interaction with the aerial vehicle 900; and/or other state information.

In some implementations, the perception system 916 can determine state data for each object over a number of iterations. In particular, the perception system 916 can update the state data for each object at each iteration. Thus, the perception system 916 can detect and track objects, such as vehicles, that are proximate to the aerial vehicle 900 over time.

The prediction system 920 is configured to predict future positions for an object or objects in the environment surrounding the aerial vehicle 900 (e.g., an object or objects detected by the perception system 916). The prediction system 920 can generate prediction data associated with objects detected by the perception system 916. In some examples, the prediction system 920 generates prediction data describing each of the respective objects detected by the perception system 916.

Prediction data for an object can be indicative of one or more predicted future locations of the object. For example, the prediction system 920 may predict where the object will be located within the next 5 seconds, 20 seconds, 200 seconds, and so forth. Prediction data for an object may indicate a predicted trajectory (e.g., predicted path) for the object within the surrounding environment of the aerial vehicle 900. For example, the predicted trajectory (e.g., path) can indicate a path along which the respective object is predicted to travel over time (and/or the speed at which the object is predicted to travel along the predicted path). The prediction system 920 generates prediction data for an object, for example, based on state data generated by the perception system 916. In some examples, the prediction system 920 also considers one or more vehicle poses generated by the pose system 918 and/or the map data 914.

In some examples, the prediction system 920 uses state data indicative of an object type or classification to predict a trajectory for the object. As an example, the prediction system 920 can use state data provided by the perception system 916 to determine a trajectory of a particular object (e.g., an object classified as a vehicle). The prediction system 920 can provide the predicted trajectory associated with the object(s) to the motion planning system 922.

In some implementations, the prediction system 920 is a goal-oriented prediction system that generates potential goals, selects the most likely potential goals, and develops trajectories by which the object can achieve the selected goals. For example, the prediction system 920 can include a scenario generation system that generates and/or scores the goals for an object and a scenario development system that determines the trajectories by which the object can achieve the goals. In some implementations, the prediction system 920 can include a machine-learned goal-scoring model, a machine-learned trajectory development model, and/or other machine-learned models.

The motion planning system 922 determines a motion plan for the aerial vehicle 900 based at least in part on the predicted trajectories associated with the objects within the surrounding environment of the aerial vehicle 900, the state data for the objects provided by the perception system 916, vehicle poses provided by the pose system 918, and/or the map data 914. Stated differently, given information about the current locations of objects and/or predicted trajectories of objects within the surrounding environment of the aerial vehicle 900, the motion planning system 922 can determine a motion plan for the aerial vehicle 900 that best navigates the aerial vehicle 900 relative to the objects at such locations and their predicted trajectories.

In some implementations, the motion planning system 922 can evaluate cost functions and/or one or more reward functions for each of one or more candidate motion plans for the aerial vehicle 900. For example, the cost function(s) can describe a cost (e.g., over time) of adhering to a particular candidate motion plan while the reward function(s) can describe a reward for adhering to the particular candidate motion plan. For example, the reward can be of opposite sign to the cost.

Thus, given information about the current locations and/or predicted future locations/trajectories of objects, the motion planning system 922 can determine a total cost (e.g., a sum of the cost(s) and/or reward(s) provided by the cost function(s) and/or reward function(s)) of adhering to a particular candidate pathway. The motion planning system 922 can select or determine a motion plan for the aerial vehicle 900 based at least in part on the cost function(s) and the reward function(s). For example, the motion plan that minimizes the total cost can be selected or otherwise determined. The motion plan can be, for example, a path along which the aerial vehicle 900 will travel in one or more forthcoming time periods. In some implementations, the motion planning system 922 can be configured to iteratively update the motion plan for the aerial vehicle 900 as new sensor data is obtained from the sensors 806. For example, as new sensor data is obtained from the sensors 806, the sensor data can be analyzed by the perception system 916, the prediction system 920, and the motion planning system 922 to determine the motion plan.

Each of the perception system 916, the prediction system 920, the motion planning system 922, and the pose system 918, can be included in or otherwise be a part of the aerial vehicle 900 configured to determine a motion plan based on data obtained from the sensors 806. For example, data obtained by the sensors 806 can be analyzed by each of the perception system 916, the prediction system 920, and the motion planning system 922 in a consecutive manner in order to develop the motion plan. While FIG. 9 depicts elements suitable for use in a vehicle autonomy system according to example aspects of the present disclosure, one of ordinary skill in the art will recognize that other vehicle autonomy systems can be configured to determine a motion plan for an autonomous vehicle based on sensor data.

The motion planning system 922 can provide the motion plan to the vehicle control systems 924 to execute the motion plan. For example, the vehicle control systems 924 can include pitch control module 926, yaw control module 928, and a throttle control system 930, each of which can include various vehicle controls (e.g., actuators or other devices or motors that control power) to control the motion of the aerial vehicle 900. The various vehicle control systems 924 can include one or more controllers, control devices, motors, and/or processors.

A throttle control system 930 is configured to receive all or part of the motion plan and generate a throttle command. The throttle command is provided to an engine and/or engine controller, or other propulsion system component to control the engine or other propulsion system of the aerial vehicle 900.

The aerial vehicle autonomy system 804 includes one or more computing devices, such as the computing device 902 which may implement all or parts of the perception system 916, the prediction system 920, the motion planning system 922, and/or the pose system 918. The example computing device 902 can include one or more processors 904 and one or more memory devices (collectively referred to as memory 906). The processors 904 can be any suitable processing device (e.g., a processor core, a microprocessor, an Application Specific Integrated Circuit (ASIC), a Field Programmable Gate Array (FPGA), a microcontroller) and can be one processor or a plurality of processors that are operatively connected. The memory 906 can include one or more non-transitory computer-readable storage mediums, such as Random Access Memory (RAM), Read Only Memory (ROM), Electrically Erasable Programmable Read Only Memory (EEPROM), Erasable Programmable Read Only Memory (EPROM), flash memory devices, magnetic disks, etc., and combinations thereof. The memory 906 can store data 912 and instructions 910 which can be executed by the processors 904 to cause the aerial vehicle autonomy system 804 to perform operations. The computing device 902 can also include a communications interface 908, which can allow the computing device 902 to communicate with other components of the aerial vehicle 900 or external computing systems, such as via one or more wired or wireless networks.

EXAMPLES

Example 1 is an aerial vehicle comprising a fuselage incorporating a battery system and a payload bay for operatively receiving and holding a payload; at least one mono-blade rotor coupled to an electric motor and an electric motor control system, the at least one mono-blade rotor to propel the aerial vehicle in a vertical direction, the electric motor control system controlling the electric motor using pulse-induced cyclic control; at least one wing; at least one cruise propeller to propel the aerial vehicle in a horizontal direction; and an avionics system to transition the aerial vehicle between a vertical take-off and landing mode in which the at least one mono-blade rotor is primarily engaged to propel the aerial vehicle and a cruising mode in which the at least one cruise propeller is primarily engaged to propel the aerial vehicle.

In example 2, the subject matter of example 1 can optionally include wherein the at least one mono-blade rotor comprises a first mono-blade rotor and a second mono-blade rotor each of which are mounted to the fuselage so as to be height offset relative to each other.

In example 3, the subject matter of any of examples 1-2 can optionally include wherein the first mono-blade rotor comprises a front mono-blade rotor coupled to a front of the fuselage and the second mono-blade rotor comprises a rear mono-blade rotor coupled to an aft of the fuselage, the rear mono-blade rotor being mounted higher with respect to the fuselage than the front mono-blade rotor.

In example 4, the subject matter of any of examples 1-3 can optionally include a lock system to lock the at least one mono-blade rotor, while stopped, into a locked position.

In example 5, the subject matter of any of examples 1-4 can optionally include wherein the lock system comprises at least one of an electromagnet or a magswitch.

In example 6, the subject matter of any of examples 1-5 can optionally include an inverted Y-tail having three rear blades and being located at an aft end of the fuselage, wherein the at least one cruise propeller comprises three cruise propellers, each propeller of the three cruise propellers being mounted on one of the three rear blades of the inverted Y-tail.

In example 7, the subject matter of any of examples 1-6 can optionally include wherein the at least one wing comprises a pair of tandem wings, each tandem wing of the pair of tandem wings being positioned at a different height with respect to the fuselage.

In example 8, the subject matter of any of examples 1-7 can optionally include wherein the at least one cruise propeller comprises a plurality of cruise propellers, one cruise propeller of the plurality of cruise propellers being located at or adjacent to each respective end of a wing of the pair of tandem wings.

In example 9, the subject matter of any of examples 1-8 can optionally include wherein a first tandem wing of the pair of tandem wings is a leading wing attached adjacent to a nose of the fuselage and a second tandem wing of the pair of tandem wings is a trailing wing attached adjacent to a tail of the fuselage.

In example 10, the subject matter of any of examples 1-9 can optionally include wherein the leading wing is positioned lower than the trailing wing relative to the fuselage.

In example 11, the subject matter of any of examples 1-10 can optionally include wherein the avionics system includes a proximity detection system and a voice annunciator to announce commencement of an operation of the at least one mono-blade rotor.

In example 12, the subject matter of any of examples 1-11 can optionally include a counterweight coupled to the at least one mono-blade rotor; and sensors located in the counterweight.

In example 13, the subject matter of any of examples 1-12 can optionally include wherein the sensors include at least one of a LIDAR sensor or a radar sensor.

Example 14 is an aerial vehicle comprising a fuselage; at least one mono-blade rotor, the at least one mono-blade rotor to propel the aerial vehicle in a vertical direction; an electric motor and an electric motor control system coupled to the at least one mono-blade rotor, the electric motor control system controlling the electric motor using pulse-induced cyclic control; and at least one cruise propeller to propel the aerial vehicle in a horizontal direction.

In example 15, the subject matter of example 14 can optionally include an avionics system to transition the aerial vehicle between a vertical take-off and landing mode and a cruising mode.

In example 16, the subject matter of any of examples 14-15 can optionally include wherein the at least one mono-blade rotor comprises a first mono-blade rotor and a second mono-blade rotor each of which are mounted to the fuselage so as to be height offset relative to each other.

In example 17, the subject matter of any of examples 14-16 can optionally include wherein the first mono-blade rotor comprises a front mono-blade rotor coupled to a front of the fuselage and the second mono-blade rotor comprises a rear mono-blade rotor coupled to an aft of the fuselage, the rear mono-blade rotor being mounted higher with respect to the fuselage than the front mono-blade rotor.

In example 18, the subject matter of any of examples 14-17 can optionally include a lock system to lock the at least one mono-blade rotor, while stopped, into a locked position.

In example 19, the subject matter of any of examples 14-18 can optionally include an inverted Y-tail having three rear blades and being located at an aft end of the fuselage, wherein the at least one cruise propeller comprises three cruise propellers, each propeller of the three cruise propellers being mounted on one of the three rear blades of the inverted Y-tail.

In example 20, the subject matter of any of examples 14-19 can optionally include a pair of tandem wings, each tandem wing of the pair of tandem wings being positioned at a different height with respect to the fuselage.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

Although an overview of the present subject matter has been described with reference to specific example embodiments, various modifications and changes may be made to these embodiments without departing from the broader scope of embodiments of the present invention.

For example, various embodiments or features thereof may be mixed and matched or made optional by a person of ordinary skill in the art. Such embodiments of the present subject matter may be referred to herein, individually or collectively, by the term "invention" merely for convenience and without intending to voluntarily limit the scope of this application to any single invention or present concept if more than one is, in fact, disclosed.

The embodiments illustrated herein are believed to be described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Moreover, plural instances may be provided for resources, operations, or structures described herein as a single instance. Additionally, boundaries between various resources, operations, and structures are somewhat arbitrary, and particular structures are illustrated in a context of specific illustrative configurations. Other allocations of functionality are envisioned and may fall within a scope of various embodiments of the present invention. In general, structures and functionality presented as separate components in the example configurations may be implemented as a combined structure or component. Similarly, structures and functionality presented as a single component may be implemented as separate components. These and other variations, modifications, additions, and improvements fall within a scope of embodiments of the present invention as represented by the appended claims. The specification and drawings are, accordingly, to be regarded in an illustrative rather than a restrictive sense.

What is claimed is:

1. An aerial vehicle comprising:
    a fuselage incorporating a battery system and a payload bay for operatively receiving and holding a payload;
    at least one mono-blade rotor coupled to an electric motor and an electric motor control system, the at least one mono-blade rotor to propel the aerial vehicle in a vertical direction, the electric motor control system using pulse-induced cyclic control that involves modulating torque applied to the at least one mono-blade rotor to control the at least one mono-blade rotor;
    at least one wing;
    an inverted Y-tail having three rear blades and being located at an aft end of the fuselage;
    three cruise propellers to propel the aerial vehicle in a horizontal direction, each propeller of the three cruise propellers being mounted on one of the three rear blades of the inverted Y-tail; and
    an avionics system to transition the aerial vehicle between a vertical take-off and landing mode in which the at least one mono-blade rotor is primarily engaged to propel the aerial vehicle and a cruising mode in which the three cruise propellers are primarily engaged to propel the aerial vehicle.

2. The aerial vehicle of claim 1, wherein the at least one mono-blade rotor comprises a first mono-blade rotor and a second mono-blade rotor each of which are mounted to the fuselage so as to be height offset relative to each other.

3. The aerial vehicle of claim 2, wherein the first mono-blade rotor comprises a front mono-blade rotor coupled to a front of the fuselage and the second mono-blade rotor comprises a rear mono-blade rotor coupled to an aft of the fuselage, the rear mono-blade rotor being mounted higher with respect to the fuselage than the front mono-blade rotor.

4. The aerial vehicle of claim 1, further comprising a lock system to lock the at least one mono-blade rotor, while stopped, into a locked position.

5. The aerial vehicle of claim 4, wherein the lock system comprises at least one of an electromagnet or a magswitch.

6. The aerial vehicle of claim 1, wherein the avionics system includes a proximity detection system and a voice annunciator to announce commencement of an operation of the at least one mono-blade rotor.

7. The aerial vehicle of claim 1, further comprising:
    a counterweight coupled to the at least one mono-blade rotor; and
    sensors located in the counterweight.

8. The aerial vehicle of claim 7, wherein the sensors include at least one of a LIDAR sensor or a radar sensor.

9. An aerial vehicle comprising:
    a fuselage;
    at least one mono-blade rotor, the at least one mono-blade rotor to propel the aerial vehicle in a vertical direction;
    an electric motor and an electric motor control system coupled to the at least one mono-blade rotor, the electric motor control system using pulse-induced cyclic control that involves modulating torque applied to the at least one mono-blade rotor to control the at least one mono-blade rotor;
    an inverted Y-tail having three rear blades and being located at an aft end of the fuselage; and
    three cruise propellers to propel the aerial vehicle in a horizontal direction, each propeller of the three cruise propellers being mounted on one of the three rear blades of the inverted Y-tail.

10. The aerial vehicle of claim 9, further comprising:
    an avionics system to transition the aerial vehicle between a vertical take-off and landing mode and a cruising mode.

11. The aerial vehicle of claim 9, wherein the at least one mono-blade rotor comprises a first mono-blade rotor and a second mono-blade rotor each of which are mounted to the fuselage so as to be height offset relative to each other.

12. The aerial vehicle of claim 11, wherein the first mono-blade rotor comprises a front mono-blade rotor coupled to a front of the fuselage and the second mono-blade rotor comprises a rear mono-blade rotor coupled to an aft of the fuselage, the rear mono-blade rotor being mounted higher with respect to the fuselage than the front mono-blade rotor.

13. The aerial vehicle of claim 9, further comprising a lock system to lock the at least one mono-blade rotor, while stopped, into a locked position.

* * * * *